(12) United States Patent
Wells et al.

(10) Patent No.: US 6,815,931 B1
(45) Date of Patent: Nov. 9, 2004

(54) MARINE CHARGE SOURCE SWITCHING SYSTEM

(75) Inventors: John T. Wells, 4 Crescent Dr., Brielle, NJ (US) 08730; Chris Hanrahan, Point Pleasant Beach, NJ (US); Ted McMahon, Port St. Lucie, FL (US)

(73) Assignee: John T. Wells, Brielle, NJ (US)

(*) Notice: Subject to any disclaimer, the term of this patent is extended or adjusted under 35 U.S.C. 154(b) by 93 days.

(21) Appl. No.: 10/207,559

(22) Filed: Jul. 29, 2002

Related U.S. Application Data

(63) Continuation-in-part of application No. 10/161,010, filed on May 31, 2002, now abandoned.

(51) Int. Cl.$^7$ .................................................. H02J 7/00
(52) U.S. Cl. ...................... 320/164; 320/155; 320/162
(58) Field of Search ................................. 320/162, 163, 320/164, 155, 157

(56) References Cited

U.S. PATENT DOCUMENTS

| | | | |
|---|---|---|---|
| 3,763,415 A | 10/1973 | Ownby | 320/6 |
| 3,949,289 A | 4/1976 | Day | 320/6 |
| 4,004,208 A | 1/1977 | Tamminen | 320/2 |
| 4,081,738 A | 3/1978 | Roller | 320/7 |
| 4,082,992 A | 4/1978 | Day | 320/6 |
| 4,090,122 A | 5/1978 | Hoinski | 320/6 |
| 4,114,082 A | 9/1978 | Scheidler | 320/7 |
| 4,139,812 A | 2/1979 | Huggins | 320/7 |
| 4,233,552 A | 11/1980 | Baumbach | 320/7 |
| 4,264,855 A | 4/1981 | Ghibaudo et al. | 320/6 |
| 4,297,629 A * | 10/1981 | Godard et al. | 320/117 |
| 4,348,628 A | 9/1982 | Loucks | 320/61 |
| 4,413,220 A * | 11/1983 | Waineo | 320/118 |
| 4,491,779 A | 1/1985 | Campbell et al. | 320/6 |
| 4,516,066 A | 5/1985 | Nowakowski | 320/15 |
| 4,564,797 A | 1/1986 | Binkley | 320/2 |
| 4,604,565 A | 8/1986 | Yokota et al. | 320/15 |
| 4,649,332 A | 3/1987 | Bell | 320/7 |
| 4,698,578 A | 10/1987 | Mullersman et al. | 320/13 |
| 4,723,105 A | 2/1988 | Matouka et al. | 320/17 |
| 4,902,956 A | 2/1990 | Sloan | 320/13 |
| 5,111,132 A * | 5/1992 | Motose | 322/90 |
| 5,225,761 A | 7/1993 | Albright | 320/15 |
| 5,233,282 A | 8/1993 | Iwashita | 320/7 |
| 5,350,994 A | 9/1994 | Kinoshita et al. | 320/15 |
| 5,418,444 A | 5/1995 | Cook et al. | 320/7 |
| 5,448,152 A | 9/1995 | Albright | 320/15 |
| 5,583,414 A | 12/1996 | Lawrence | 320/15 |
| 5,767,658 A | 6/1998 | Hayes | 320/104 |
| 5,844,325 A | 12/1998 | Waugh et al. | 307/10.7 |
| 5,896,022 A | 4/1999 | Jacobs, Sr. | 320/103 |
| 5,905,360 A | 5/1999 | Ukita | 320/118 |
| 6,037,749 A | 3/2000 | Parsonage | 320/132 |
| 6,087,735 A | 7/2000 | Nakamura | 307/9.1 |

* cited by examiner

*Primary Examiner*—Bao Q. Vu
(74) *Attorney, Agent, or Firm*—Akerman Senterfitt

(57) ABSTRACT

A battery charging system includes a first charge source for connection to a first engine and at least a second charge source for connection to at least a second engine. A first battery is connected to the first charge source. At least a second battery is connected to the second charge source. At least a third battery is provided and is connected to a load. A switch is adapted in the first mode of operation to connect the third battery to the first charge source, and in a second mode of operation to connect the third battery to the second charge source. In a third mode of operation, the switch can isolate the third battery from the first and second charge sources as a fail-safe, and provide an alarm of this status. The invention is particularly adapted for use in marine vessels to prevent start batteries from discharging to a point where the voltage is insufficient to start an engine. A switch assembly and a method according to the invention are also disclosed.

31 Claims, 3 Drawing Sheets

MARINE CHARGE SOURCE SWITCHING SYSTEM

CROSS REFERENCE TO RELATED APPLICATIONS

This application is a continuation in part of U.S. patent application, Ser. No. 10/161,010, filed May 31, 2002 now abandoned.

STATEMENT REGARDING FEDERALLY SPONSORED RESEARCH OR DEVELOPMENT (Not Applicable)

FIELD OF THE INVENTION

This invention relates generally to battery charging systems, and more particularly to marine battery charging systems.

BACKGROUND OF THE INVENTION

Marine craft frequently have more than one engine. Each engine typically has its own alternator and battery to create separate electrical systems, such that the failure of one electrical system will not totally disable the marine craft. These batteries are sometimes referred to as start or crank batteries because they are utilized to crank the respective engine during the engine starting procedure. Another battery, sometimes referred to as the house battery, is provided for powering the various electronic accessories and non-engine equipment of the vessel. These accessories can include electronic equipment such as radar, LORAN, and radios, as well as pumps, cooling devices such as refrigerators, air conditioners and fans, electric motors, and bait well aerators. The alternators associated with each engine typically are sufficient to maintain a proper voltage in each of the associated start batteries, provided that the engines are operating at sufficient RPMs to drive the alternators. The house battery is typically connected in parallel with one of the start batteries, such that the house battery will be charged by the respective engine alternator.

Under certain conditions, where there is low alternator output such as when trolling at low speeds, the associated start battery and house battery can become drained. The situation can become particularly acute if there is high demand on the house battery through the operation of electronic devices that are connected to the house battery. In such instances, the charge on the associated start battery may fall below levels which are necessary to start the engine. Battery voltage monitors and battery switching systems have been provided for monitoring the voltage in batteries and switching among batteries if the voltage level in a battery falls below a threshold value. Such systems, however, sometimes result in both start batteries becoming drained to near the threshold level, and the system repeatedly switches between the near-threshold voltage batteries such that no battery becomes fully recharged.

This reduction in start battery charge presents additional problems in new marine engines that utilize electronic engine control. The electronic engine control systems require a reliable battery source to power the control electronics. Thus, when the crank battery falls below a certain threshold, not only is there insufficient power to start the engines, but the electronic controls will shut down the engine when the power level is too low for the electronic controls themselves. As a result, major marine engine manufacturers specify that external charging systems connected to multiple engines should not be arranged to draw charge power from the alternators or other charging sources of more than one engine at a time. Accordingly, there is a need for an external charging system that utilizes the charging capabilities of more than one engine while observing this manufacturer specification.

SUMMARY OF THE INVENTION

A system for charging batteries includes a first charge source for connection to a first engine; at least a second charge source for connection to at least a second engine; a first start battery connected to said first charge source; at least a second battery connected to said second charge source; at least a third battery; and at least one switch adapted in a first mode of operation to connect said third battery to said first charge source, and in a second mode of operation to connect said third battery to said second charge source.

A voltage monitor is preferably provided to monitor the voltage in at least the first battery and the second battery. The switch is responsive to the voltage to switch the third battery between a connection to the first charge source and a connection to the second charge source. The switch can switch the third battery from the first charge source if the voltage in the first battery falls below a threshold voltage, and can switch the third battery from the second charge source if the voltage in the second battery falls below a threshold voltage. A timer can be provided for maintaining the connection between the third battery and the first charge source or the second charge source for a given period of time prior to switching to another charge source.

The invention is particularly adaptable to marine engine systems. The first and second charge sources can be alternators powered by the engines. The first battery and second battery can be start batteries, and the third battery can be a house battery. The house battery is connected to marine electronics such as radar, LORAN, radios, pumps, cooling devices, electric motors and bait well aerators.

A switch assembly according to the invention includes structure for connection to a first charge source; structure for connection to a second charge source; structure for connection to a first battery, and for connecting the first charge source to the first battery; structure for connection to a second battery, and for connecting the second charge source to the second battery; structure for connecting to a third battery; and at least one switch for switching between a first mode of operation in which the third battery is connected to the first charge source, and a second mode of operation in which the third battery is connected to the second charge source.

The switch can also include control logic for switching the third battery between the first charge source and the second charge source responsive to the voltage in the respective first battery and second battery. The switch assembly will switch the third battery from the first charge source if the voltage in the first battery falls below a threshold level. The switch assembly will switch the third battery from the second charge source if the voltage in the second battery falls below a threshold voltage. A timer can be provided to maintain the switch in a position for a given length of time to prevent repeated switching between charge sources. The switch assembly is particularly useful in the marine environment. The first and second batteries can be start batteries. The third battery can be a house battery. The first and second charge sources can be alternators, powered by marine engines.

According to another optional aspect of the invention, the charging system can be arranged so that if the voltage levels of both engines are below the threshold level when checked by the monitoring system, the charging system can switch to a third configuration. In the third configuration, the third battery can be isolated from both charge sources. While any further charging of the third battery is terminated during this third configuration, both charge sources can then attempt to recharge to the first and second engine batteries, without further loading from the third battery. Optionally, switching to this third configuration can be accompanied by an alarm, either visual, audible or both, to alert the user that the third battery is no longer being charged, presenting the risk of failure of accessories powered by the third battery. More importantly, the alarm can alert the user that the crank batteries have both fallen below the threshold voltage and risk shutting down the engines, in case of electronic controlled engines, and may not have sufficient power to crank the engines after shut-down. The user can address the low voltage situation, for example, by running the engines at higher RPM's to recharge the two crank batteries.

If through user intervention or through relief from charging the third battery, one of the crank batteries returns to a voltage level above the threshold voltage, the charging system can detect this increased voltage through the monitoring system and resume the charging connection to the third battery. The criterion for re-establishing the charge to the third battery can be set to occur when either one of the crank batteries returns to a voltage level above the threshold level or only when both crank batteries return to the proper voltage level.

A method for charging batteries includes the steps of:
connecting at least a first battery to at least a first charge source;
connecting at least a second battery to at least a second charge source;
connecting at least a third battery to a switch assembly;
monitoring the voltage in at least the first battery and the second battery; and,
switching the third battery from the first charge source to the second charge source if the first battery has a voltage below a threshold voltage, and
switching the third battery from the second charge source to the first charge source if the second battery has a voltage below a threshold voltage.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
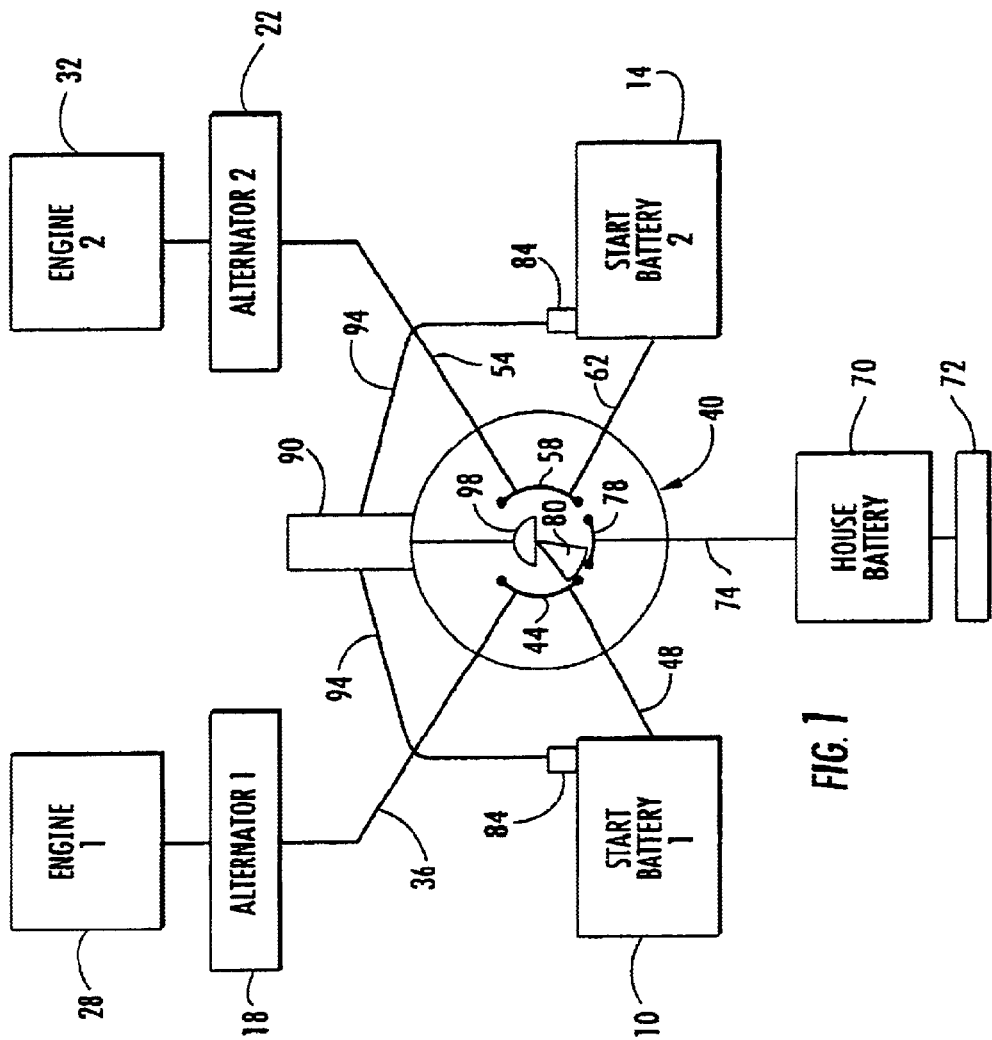
FIG. 1 is a schematic diagram of a battery switching system according to the invention in a first mode of operation.

There is shown in FIG. 1 a battery charging system according to the invention. The battery charging system includes a first battery 10 and at least a second battery 14. The first battery 10 is connected to a first charge source 18, and the second battery 14 is connected to a second charge source 22. The charge source 18 is powered by a motor 28 and the second charge source 22 is powered by a motor 32. The first charge source 18 can be connected through suitable connecting structures such as line 36 to a switch assembly 40. The switch assembly 40 has suitable connecting structures such as bus 44 to provide connection between the first charge source 18 and the battery 10. A connecting line 48 can electrically connect the switch assembly 40 to the battery 10. The second charge source 22 is connected through suitable connection structure such as line 54 to the switch assembly 40. Suitable connection structure such as bus 58 connects the second charge source 22 to the second battery 14 through a connecting line 62.

A third battery 70 can be connected to the switch assembly 40 through suitable structure such as connecting line 74. The third battery 70 can be connected to the first charge source 18 through appropriate connection structure in the switch assembly 40. Any suitable connection structure can be used. A terminal 78 in switch assembly 40 can be provided to connect the switch assembly 40 to the connecting line 74. In the embodiment shown, a switch 80 is used to make an electrical connection between the bus 44 and the terminal 78, such that the first battery 10 and third battery 70 are connected in parallel to the first charge source 18. In a second position of the switch 80, shown in FIG. 2, an electrical connection is made between the terminal 78 and the bus 58. The third battery 70 is thereby connected to the second charge source 22 and is in parallel with the second battery 14. The switch assembly 40 is thereby capable of connecting the third battery 70 to the first charge source 18 or the second charge source 22.

Figure 2:
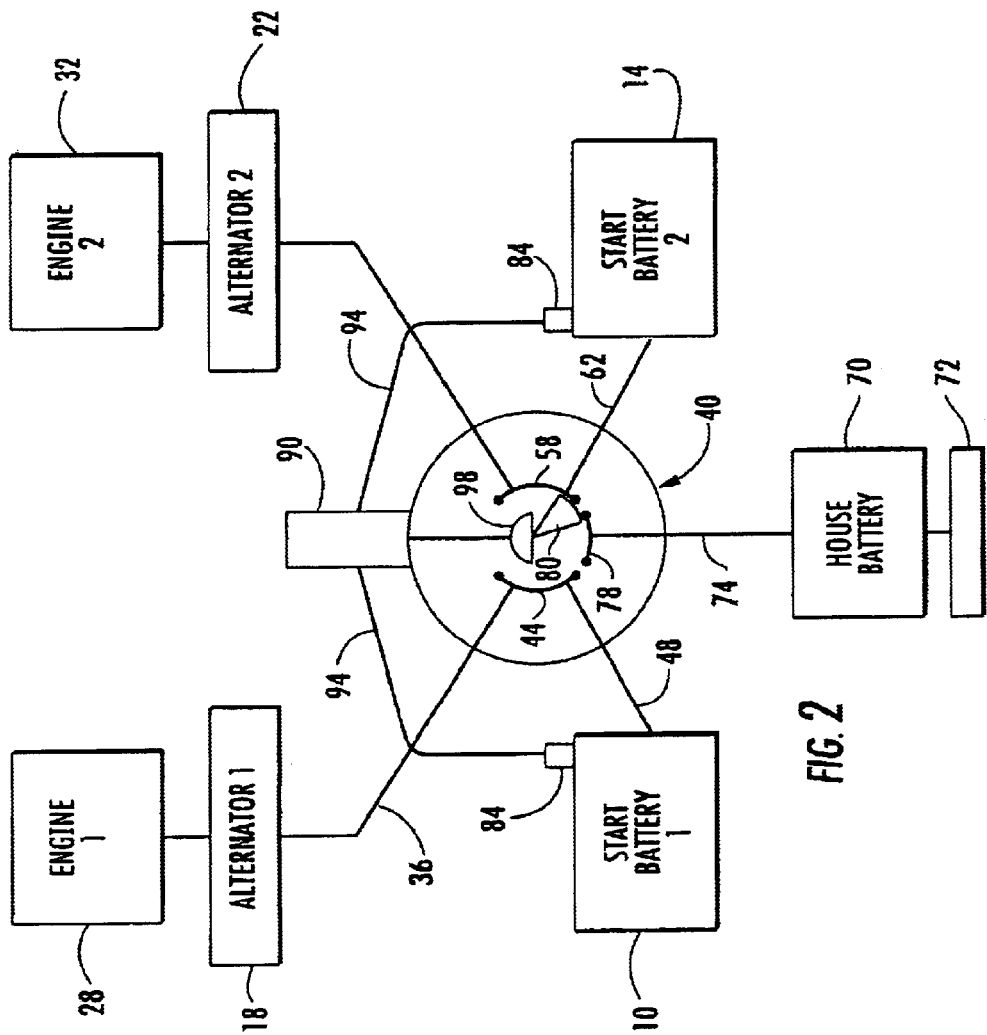
FIG. 2 is a schematic diagram of the battery charging system of FIG. 1 in a second mode of operation.
Figure 3:
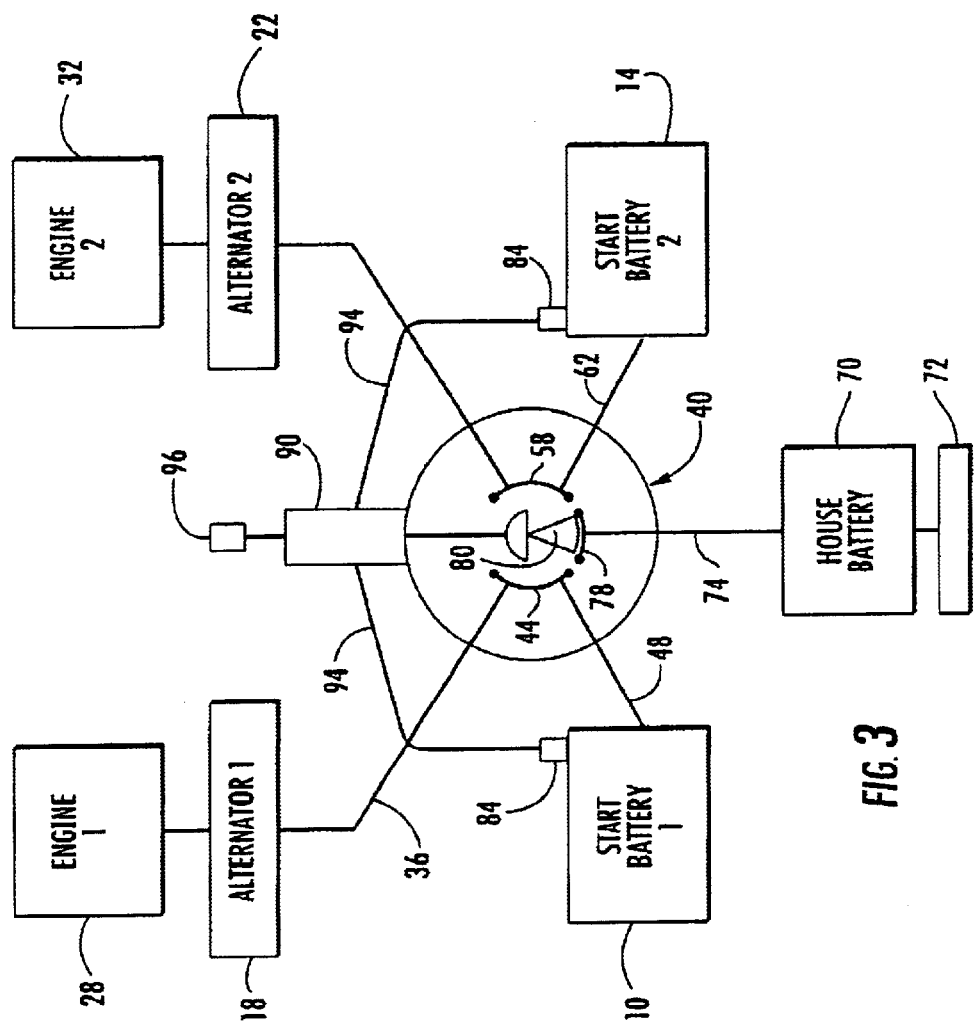
FIG. 3 is a schematic diagram of the battery charging system of FIG. 1 in a third mode of operation.

The third battery is connected to a load 72, which can drain the third battery 70 and either the first battery 10 or second battery 14, whichever the third battery 70 is connected to. The switching of the third battery 70 between the first charge source 18 and the second charge source 22 is performed in such a manner as to maintain the charge optimally between the batteries. In the event that the voltage of the first battery 10 or second battery 14 falls below a threshold value, the switch assembly 40 will switch to another charge source such that the battery having a low voltage will receive the full charge from the respective charge source. In the case shown in FIG. 1 where the first battery 10 and third battery 70 are connected to the first charge source 18, it can occur that the first battery 10 can become drained, particularly when the engine 28 is operating at slow speeds and there is a significant drain on the third battery 70. The switch assembly can be operated to switch the third battery 70 from connection to the first charge source 18, as shown in FIG. 1, to a connection with the second charge source 22, as shown in FIG. 2. In this manner, the first battery 10 will receive the full charge from the first charge source 18.

In one embodiment of the invention, voltage monitors 84 are provided to monitor the voltages of at least the first battery 10 and second battery 14. The voltage monitors 84 can provide signals of the voltage in the respective battery to a controller 90 through lines 94. The controller 90 can compare the voltage received from a battery to a threshold voltage and cause the switch assembly 40 to switch between the first charge source 18 and second charge source 22 as necessary to retain voltage in the respective first battery 10 and second battery 14. In the embodiment shown, this can be accomplished through the action of a suitable solenoid 98 which operates the switch 80 under the control of the controller 90.

Alternative structure for switching the third battery 70 from the first charge source 18 to the second charge source 22 is possible. The switch assembly 40 can be any of several different switch designs. The switch assembly 40 can take other forms including hardwired constructions and integrated circuit constructions, or combinations thereof. The switch assembly can be provided as a pre-packaged unit with terminals provided for the electrical connection of the various components to the switch assembly 40. The circuit design for switching the third battery 70 between the first charge source 18 and second charge source 22 can also be varied.

In some instances, the voltages in the first battery 10 and second battery 14 may be nearly the same, and near the threshold value. In this case, the switch assembly would toggle repeatedly between connecting the third battery 70 to the first charge source 18 and the second charge source 22. As the result, neither the first battery 10 or second battery 14 would become sufficiently charged. To avoid this, a timer can be provided such that the switch assembly maintains the connection of the third battery 70 to the first charge source 18 or second charge source 22 for a pre-determined period of time. This will permit a battery to receive the full benefit of the respective charge source so as to sufficiently charge the respective first battery 10 or second battery 14.

The invention is particularly suitable in marine craft. The first engine 28 and second engine 32 can be marine engines, such as inboard, inboard-outboard, and outboard engines. The first charge source 18 and second charge source 22 are alternators. The first battery 10 and second battery 14 can be start batteries which are used to crank the first respective first engine 28 and second engine 32. The third battery 70 can be a house battery that is used to run marine electronics such as radar, LORAN, lights, pumps, aerators, and electric motors. In this embodiment, the invention will help to prevent the start batteries from falling to a voltage so low as to not be able to start the respective engine.

According to another optional aspect of the invention, the charging system can be arranged so that if the voltage levels of both the first and second batteries 10, 14 are below the threshold level when checked by the monitoring system of the controller 90, the charging system can switch to a third mode of operation. In this third mode, the third battery 70 can be isolated from both charge sources 18, 22 and both the first and second batteries 10, 14.

For example, if the first battery falls below the threshold voltage level, the management system switches from the first mode to the second mode as explained above. The controller 90 can periodically monitor the voltage level of the first battery 10 after a predetermined time. If the first battery has regained sufficient voltage level, such as 13.4 V, then the management system can switch back to the first mode. In this way, the first battery 10 operates as the master charge battery, and the second battery 14 serves as the secondary or back-up charge battery.

If the voltage level of the first battery 10 still has not exceeded the threshold voltage when periodically checked, the management system keeps the switch in the second mode. Over time for some reason, such as running the engines and the corresponding alternators to low, the first battery 10 and the second battery 14 fall below the threshold voltage, the switch 80 will change to the third mode.

While further charging of the third battery 70 is terminated during this third mode, both charge sources can then attempt to recharge to the first and second batteries 10, 14, without further loading from the third battery 70. Optionally, switching to this third mode can be accompanied by an alarm 96, either visual, audible or both, to alert the user that the third battery 70 is no longer being charged, presenting the risk of failure of accessories 72 powered by the third battery 70. More importantly, the alarm 96 can alert the user that the batteries 14, 16 have both fallen below the threshold voltage and risk shutting down the engines, in the case of electronic controlled engines, and may not have sufficient power to crank the engines after shut-down. The user can address the low voltage situation, for example, by running the engines at higher RPM's to recharge the two crank batteries 10, 14.

If through user intervention or through relief from charging the third battery 70, one of the crank batteries 10, 14 returns to a voltage level above the threshold voltage, the charging system can detect this increased voltage through the monitoring system of the controller 90 and resume the charging connection to the third battery 70. The criterion for re-establishing the charge to the third battery 70 can be set to occur when either one of the batteries 10, 14 returns to a voltage level above the threshold level or only when both batteries 10, 14 return to the proper voltage level.

In a method according to the invention, at least a first battery is connected to at least a first charge source. At least a second battery is connected to at least a second charge source. A third battery is connected to a switch assembly. The voltage is monitored in the first and second batteries, and the switch assembly switches the third battery from its connection to the first charge source if the first battery falls below a threshold voltage, and from a connection to the second charge source 22 if the voltage of the second battery 14 falls below a threshold voltage.

The connections can be maintained for a pre-determined length of time in order to permit sufficient charging of the respective first battery 10 or second battery 14. The method can further include the step of monitoring the voltage in the respective first battery 10 and second battery 22 and switching based upon measurements of the respective voltages. In one aspect, the method would switch whenever one of the voltages exceeds the other by a predetermined amount.

Although the invention has been shown with respect to a first battery 10 and a second battery 14, the invention has utility for any number of batteries. Additionally, although the invention has been shown with respect to the third battery 70, the invention has utility for more than one battery, such as a bank of batteries, which draw current in parallel to batteries associated with charge sources.

The invention can take other specific forms without departing from the spirit or essential attributes thereof, and accordingly, reference should be had to the following claims, rather than to the foregoing specification, as indicating the scope of the invention.

We claim:

1. A charge source switching system, comprising:
   a first charge source for connection to a first engine;
   at least a second charge source for connection to at least a second engine;
   a first battery connected to said first charge source;
   at least a second battery connected to said second charge source;
   at least a third battery connected to a load; and
   a switch adapted in a first mode of operation to connect said third battery to said first charge source, and in a second mode of operation, to automatically connect said third battery to said second charge source.

2. The charge source switching system of claim 1, wherein said switch is adapted to automatically disconnect said third battery from said first charge source in said second mode of operation.

3. The charge source switching system of claim 1, further comprising a voltage monitor for monitoring the voltage in the first battery and the second battery.

4. The charge source switching system of claim 3, wherein said switch is responsive to voltage signals from said voltage monitor to switch between said first mode of operation and second mode of operation.

5. The charge source switching system of claim 4, wherein said switch is adapted to further operate in a third mode of operation in which said third battery is automatically disconnected from said first charge source and said second charge source, said switch switching to said third mode when the voltage signals of both said first battery and said second battery fall below a threshold voltage.

6. The charge source switching system of claim 5, wherein said threshold voltage is pre-determined.

7. The charge source switching system of claim 5, further comprising an alarm operatively connected to the switch to alert the user when the switch switches to said third mode of operation.

8. The charge source switching system of claim 4, further comprising a timer for maintaining said switch in said first mode of operation or said second mode of operation for a pre-determined time.

9. The charge source switching system of claim 1, further comprising a solenoid that operates said switch between said first mode of operation and said second mode of operation.

10. The charge source switching system of claim 1, wherein said system is provided on a marine vessel.

11. The charge source switching system of claim 10, wherein said first charge source and second charge source are alternators, said first battery and second battery are start batteries associated with starting said engines, and said third battery is a house battery.

12. The charge source switching system of claim 1, further comprising at least a third charge source.

13. The charge source switching system of claim 12, further comprising at least a fourth battery connected to said at least third charge source.

14. A switch assembly, comprising
a terminal for connection to a first charge source;
a terminal for connection to a second charge source;
a terminal for connection to a first battery, and for connecting said first charge source to said first battery;
a terminal for connection to said second battery, and for connecting said second charge source to said second battery;
a terminal for connecting to a third battery;
said switch assembly further comprising a switch means for switching between a first mode of operation in which said third battery is connect to said first charge source, and a second mode of operation in which said third battery is connected to said second charge source.

15. The switch assembly of claim 14, further comprising a voltage monitor for monitoring the voltage in said first battery and said second battery.

16. The switch assembly of claim 15, wherein said switch is responsive to voltage signals from said voltage monitor to switch between said first mode of operation and said second mode of operation.

17. The switch assembly of claim 16, further comprising a timer for maintaining said switch in said first mode of operation or said second mode of operation for a predetermined time.

18. The switch assembly battery of claim 16, wherein said system is provided on a marine vessel.

19. The switch assembly of claim 18, wherein said first charge source and said second charge source are alternators connected to respective marine engines, said first battery and said second battery are start batteries associated with starting said engines, and said third battery is a house battery associated with operating marine electronics.

20. The switch assembly of claim 14, wherein said switch assembly further comprises a solenoid that operates said switch means between said first mode of operation and said second mode of operation.

21. A method for switching a charge source, comprising the steps of:
connecting at least a first battery to at least a first charge source;
connecting at least a second battery to at least a second charge source;
connecting at least a third battery to a switch assembly;
monitoring a voltage in said first battery and a voltage in said second battery;
switching the third battery from a connection to the first charge source if the voltage in the first battery falls below a first threshold voltage, and switching the third battery from the second charge source if the voltage in the second battery falls below a second threshold voltage.

22. The method of switching a charge source according to claim 21, wherein the first charge source and the second charge source are alternators connected to respective marine engines, the first battery and the second battery are start batteries associated with starting the engines, and the third battery is a house battery associated with operating marine electronics.

23. The method of switching a charge source according to claim 21, further comprising the steps of timing of connection after switching to one of the first battery and the second battery and maintaining the connection for a predetermined amount of time.

24. The method of switching a charge source according to claim 21, wherein at least one of the first and second threshold voltages is pre-determined.

25. The method of switching a charge source according to claim 21, wherein said first threshold voltage and said second threshold voltage have equivalent values.

26. A charge source switching system, comprising:
a first charge source;
at least a second charge source;
a first battery connected to said first charge source;
at least a second battery connected to said second charge source;
at least a third battery connected to a load;
a switch adapted in a first mode of operation to connect said third battery to said first charge source, and in a second mode of operation, to connect said third battery to said second charge source;
wherein at least one of said first charge source and said second charge source is connected to an engine.

27. A charge source switching system, comprising:
a first marine engine having a first alternator;
a second marine engine having a second alternator;
a first start battery connected to the first alternator to receive charge from the first alternator;
a second start battery connected to the second alternator to receive charge from the second alternator;

a third battery connected to a load;

a voltage monitor for monitoring the voltage in the first battery and the second battery; and a switch adapted in a first mode of operation to connect said third battery to said first alternator to receive charge from the first alternator, and in a second mode of operation, to automatically connect said third battery to said second charge source to receive charge from the second alternator, said switch responsive to said voltage monitor to switch between said first mode of operation and second mode of operation, wherein said switch operates in the second mode of operation when the voltage of the first battery falls below a first threshold voltage and the voltage of the second battery is above a second threshold voltage and the switch operates in the first mode of operation when the voltage of the second battery fall below the second threshold voltage and the voltage of the first battery is above the first threshold voltage.

28. The charge source switching system of claim 27, wherein the first threshold voltage and the second threshold voltage are substantially equal.

29. The charge source switching system of claim 27, wherein said switch is adapted to further operate in a third mode of operation in which said third battery is automatically disconnected from said first charge source and said second charge source when the voltage of said first battery falls below the first threshold voltage and the voltage of said second battery falls below the second threshold voltage.

30. The charge source switching system of claim 29, wherein the first threshold voltage and the second threshold voltage are substantially equal.

31. The charge source switching system of claim 27, further comprising a timer for maintaining said switch in a current one of said first mode of operation and said second mode of operation for a pre-determined time.

\* \* \* \* \*